(12) United States Patent
Davis

(10) Patent No.: US 6,498,980 B1
(45) Date of Patent: Dec. 24, 2002

(54) METHOD FOR DETERMINING A POSITION OF A ROTATING SHAFT

(75) Inventor: Jason T. Davis, Williamston, MI (US)

(73) Assignee: General Motors Corporation, Detroit, MI (US)

( * ) Notice: Subject to any disclaimer, the term of this patent is extended or adjusted under 35 U.S.C. 154(b) by 38 days.

(21) Appl. No.: 09/724,086

(22) Filed: Nov. 28, 2000

(51) Int. Cl.$^7$ ............................. F02D 41/30; F02P 7/077
(52) U.S. Cl. ..................... 701/114; 73/118.1; 702/151
(58) Field of Search ............................. 123/406.58, 476, 123/477, 612, 613, 617; 701/101, 102, 115, 114; 702/33, 151; 73/116, 118.1, 119 R

(56) References Cited

U.S. PATENT DOCUMENTS 5,165,271 A  * 11/1992 Stepper et al. .............. 123/617

* cited by examiner

Primary Examiner—Andrew M. Dolinar
Assistant Examiner—Johnny H. Hoang
(74) Attorney, Agent, or Firm—Anthony Luke Simon

(57) ABSTRACT

A method for determining a position of a rotating shaft and, more particularly, for determining a sync position of an engine crankshaft or engine camshaft. The method includes sequentially measuring consecutive time periods generated in response to rotation of the shaft, and comparing each measured time period to a value calculated from a predetermined function based on more than one measured time period to determine the sync position. Preferably, the comparing step includes comparing a penultimate measured time period to a product of a sync factor and the sum of an ultimate measured time period, the penultimate measured time period, and an antepenultimate measured time period. After determining the sync position, the method includes sequentially measuring a predetermined number of consecutive time periods generated in response to further or continued rotation of the shaft, and comparing a penultimate measured time period to a value calculated from the predetermined function to verify the sync position.

16 Claims, 3 Drawing Sheets

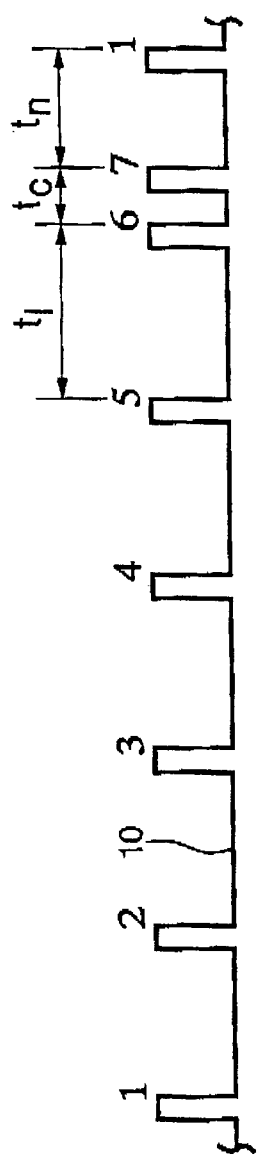
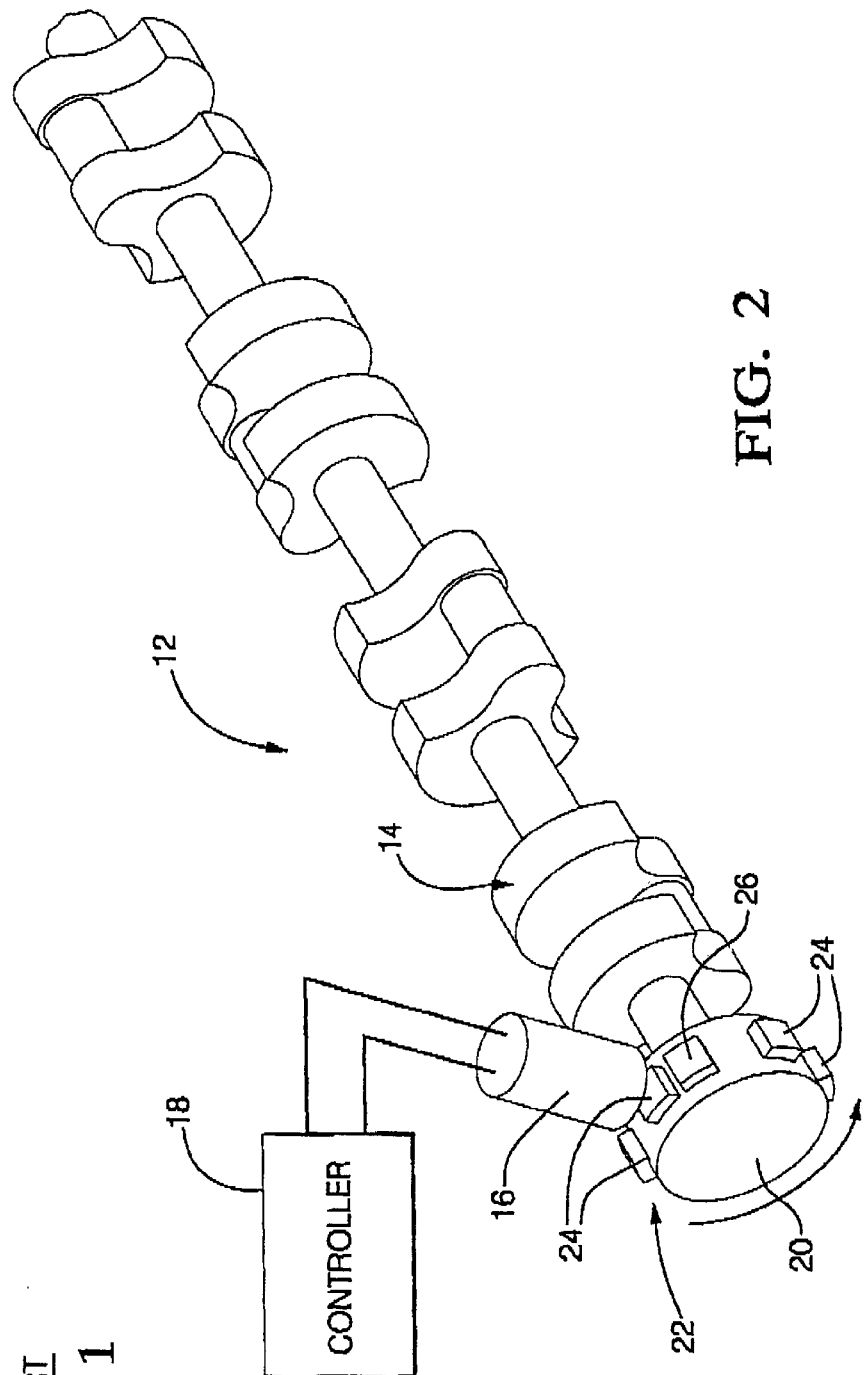

METHOD FOR DETERMINING A POSITION OF A ROTATING SHAFT

FIELD OF THE INVENTION

The present invention relates to methods for determining a position of a rotating shaft.

BACKGROUND OF THE INVENTION

Crankshaft position information and/or camshaft position information is vital to provide accurate spark plug ignition and fuel injection in most vehicle engines. One prior art system for detecting the position of a rotating shaft utilizes feature pattern recognition to determine a synchronization or sync position of the shaft. The prior art system includes a target wheel having a predetermined feature pattern rotating with the shaft during engine operation, means for generating an electrical signal in response to rotation of the feature pattern, and means for identifying a sync period from the generated feature pattern signal and determining the sync position of the shaft. The feature pattern is formed with a plurality of timing features including a sync feature. The sync feature can be either an extra or missing timing feature on the target wheel.

FIG. 1 is a graph illustrating an electrical signal 10 produced in response to rotation of a feature pattern on a target wheel fixed to an engine shaft and including a sync period determined in accordance with a prior art method. The feature pattern includes six consecutive timing features producing six consecutive pulses, labeled as 1–6 respectively in FIG. 1, and a seventh or sync feature producing one pulse, labeled as 7 in FIG. 1. In this embodiment, the seventh or sync feature is uniquely spaced on the target wheel. More specifically, consecutive features are equally spaced with the exception of the sync or seventh feature which is uniquely spaced by a shorter distance from the sixth and first timing features. In other words, the fifth and sixth timing features and the sixth and first timing features are equally spaced, and the seventh or sync feature is disposed between the sixth and first timing features with the sync feature spaced closer to the sixth feature than the first feature.

One prior art method of identifying the sync period includes the steps of: measuring time periods between consecutive pulses; determining whether the current time period is a predetermined fraction of the last time period; and if the current time period is a predetermined fraction of the last time period, measuring the next time period and determining if the next time period is a predetermined multiple of the current time period to locate the sync period and determine the sync position of the shaft. For example, assume that the current time period ($t_c$) is the time period between the sixth pulse and the seventh pulse as labeled in FIG. 1. If the current time period ($t_c$) is the predetermined fraction of the last time period ($t_l$), i.e. the time period between the fifth pulse and the sixth pulse as labeled in FIG. 1, then the next time period ($t_n$), i.e. the time period between the seventh pulse and the first pulse as labeled in FIG. 1, is measured. If the next time period ($t_n$) is a predetermined multiple of the current time period ($t_c$), then the sync period is determined to be the time period between the sixth pulse and the seventh pulse.

However, some vehicle engines produce large engine r.p.m. oscillations during starting conditions shortening or lengthening the time period being measured and, thus, resulting in either missed feature recognition or false feature detection of the sync period when using the prior art method.

Accordingly, there is a desire to provide an improved method of determining a position of an engine shaft during engine operation or shaft rotation.

SUMMARY OF THE INVENTION

The present invention provides a method for determining a position of a rotating shaft and, more particularly, for determining a synchronization or sync position of an engine crankshaft or engine camshaft. The method includes sequentially measuring consecutive time periods generated in response to rotation of the shaft, and comparing each measured time period to a value calculated from a predetermined function based on more than one measured time period to determine the sync position.

Preferably, the comparing step includes the step of comparing a penultimate measured time period to a product of a sync factor and the sum of an ultimate measured time period, the penultimate measured time period, and an antepenultimate measured time period.

After determining the sync position, the method includes sequentially measuring a predetermined number of consecutive time periods generated in response to further or continued rotation of the shaft, and comparing a penultimate measured time period to a value calculated from the predetermined function to verify the sync position. In other words, after the sync position is located, the method performs the comparing step to verify the sync position only with selected time periods or at selected sync and timing features.

BRIEF DESCRIPTION OF THE DRAWINGS

The description herein makes reference to the accompanying drawings wherein like reference numerals refer to like parts throughout the several views, and wherein:

FIG. 1 is a graph illustrating an electrical signal produced in response to rotation of a feature pattern on a target wheel fixed to an engine shaft and including a sync period determined in accordance with a prior art method;

FIG. 2 is a schematic of a system for determining a position of an engine shaft;

DESCRIPTION OF THE PREFERRED EMBODIMENT

Figure 3:
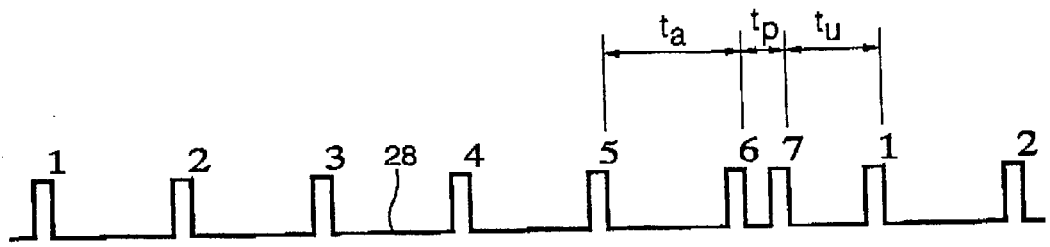
FIG. 3 is a graph of an electrical signal generated in response to rotation of a feature pattern on a target wheel fixed to an engine shaft and including a sync period determined in accordance with the present invention.

FIG. 2 is a schematic of a system 12 for determining an angular or rotational position of an engine shaft 14, such as a crankshaft (as illustrated in FIG. 2) or a camshaft. The system 12 utilizes feature pattern recognition to locate a synchronization or sync position of the engine crankshaft 14. The system 12 includes the engine crankshaft 14, a sensor 16, and a controller 18. The engine crankshaft 14 includes a target wheel 20 having a predetermined feature or tooth pattern 22 rotating with the crankshaft 14 during engine operation. The sensor 16 generates an electrical signal in response to rotation of the feature pattern 22. The controller 18 locates the sync period of the generated feature pattern signal and determines the sync position of the crankshaft 14. Preferably, the controller 18 includes a CPU for executing a stored control program and operating a data and control program storage device. The feature pattern 22 is formed with a plurality of timing features or teeth 24 including a sync feature or tooth 26. The sync feature 26 is either an extra timing feature, as illustrated in FIG. 2, or a missing timing feature on the target wheel 20. In a preferred embodiment, the feature pattern 22 includes six consecutive timing features 24, referred to as the first, second, third, fourth, fifth, and sixth timing features respectively, for producing six consecutive pulses and a seventh or sync feature 26 for producing one uniquely spaced pulse. Consecutive features are equally spaced with the exception of the seventh or sync feature 26 which is uniquely spaced a shorter distance from the sixth and first timing features. In other words, the fifth and sixth timing features and the sixth and first timing features are equally spaced, and the seventh or sync feature 26 is disposed between the sixth and first timing features with the sync feature 26 spaced closer to the sixth feature than the first feature. Accordingly, each complete revolution of the crankshaft 14 produces seven pulses.

When a feature pattern includes a number of equally spaced timing features and the sync feature is an extra feature, as illustrated in FIG. 2 where the feature pattern 22 includes six, equally spaced timing features 24 and the seventh feature 26 is the sync feature, the target wheel is described as an extra sync feature target wheel. The target wheel 20 as illustrated in FIG. 2 is commonly referred to as a 7x or seven feature target wheel. When a feature pattern includes a number of equally spaced timing features and the sync feature is a missing or removed timing feature, the target wheel is described as having a missing sync feature target wheel. In one common example of a missing sync feature target wheel, the feature pattern includes fifty-eight equally spaced features with two missing or removed features located at the fifty-ninth and sixtieth positions. Thus, the second through fifty-seventh features are spaced six degrees from adjacent features, the first feature is spaced eighteen degrees from the fifty-eighth feature and six degrees from the second feature, and the fifty-eighth feature is spaced six degrees from the fifty-seventh feature and eighteen degrees from the first feature. This type of target wheel is commonly referred to as a 58x or fifty-eight feature target wheel.

FIG. 3 is a graph of an electrical signal 28 generated in response to rotation of the feature pattern 22 on the target wheel 20 fixed to the engine shaft 14 and including a sync period determined in accordance with the present invention. The electrical signal 28 includes six consecutive pulses, referred to as the first, second, third, fourth, fifth, and sixth pulses and labeled as 1–6 respectively in FIG. 3, and one sync pulse, referred to as the seventh pulse and labeled as 7 in FIG. 3. The first-sixth pulses are produced by the six consecutive features 24 on the feature pattern 22 and the seventh pulse is produced by the sync feature 26 on the feature pattern 22. As best illustrated by the shape of the electrical signal 28, consecutive features on the target wheel 20 are equally spaced with the exception of the seventh or sync feature 26 which is uniquely spaced a shorter distance from the sixth and first timing features. In other words, on the seven feature target wheel 20 the fifth and sixth timing features and the sixth and first timing features are equally spaced, and the seventh or sync feature 26 is disposed between the sixth and first timing features with the sync feature 26 spaced closer to the sixth feature than the first feature as illustrated by the shape of the electrical signal 28.

Figure 4:
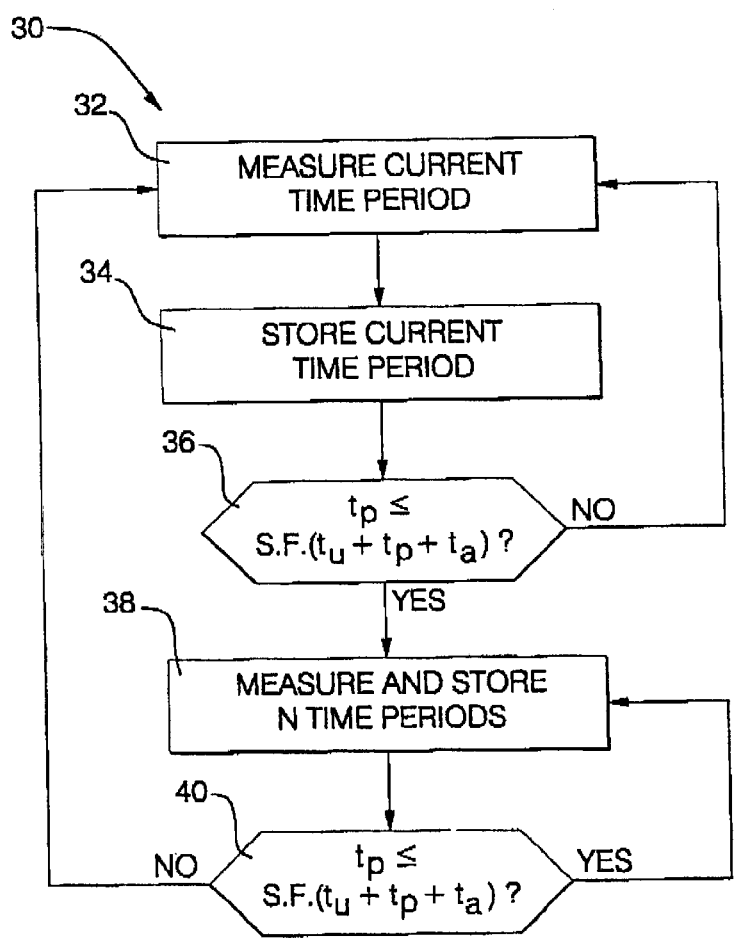
FIG. 4 is a flow chart of a method for determining a position of an engine shaft in accordance with the present invention.

Referring now to FIG. 4, a flow chart illustrating a method 30 for determining the sync position of the engine shaft 14 in accordance with the present invention is shown. As will be appreciated by one of ordinary skill in the art, although the flow chart illustrates sequential steps, the particular order of processing may be altered and still achieve the advantages of the present invention. As will also be recognized, the method illustrated may be performed in software in the controller 18, hardware in the system 12, or a combination of both as in a preferred embodiment of the present invention.

The method 30 includes sequentially measuring consecutive time periods between pulses of an electrical signal generated by the sensor 16 in response to rotation of the shaft 14, as represented by step 32, and storing the measured time periods in a data storage device, as represented by step 34. Preferably, the storage device in the controller 18 is a first-in/first-out or rotating buffer for storing the last three consecutive measured time periods.

Each measured time period is compared to a value calculated from a predetermined function based on more than one measured time period to locate the sync period, as represented by step 36. In one embodiment of the method 30, the predetermined function is a product of a sync factor (S.F.) and the sum of an ultimate or last measured time period ($t_u$), a penultimate or next to last time period ($t_p$), and an antepenultimate or before the next to last time period ($t_a$). In a preferred embodiment of the method 30, the step represented by step 36 further includes the step of comparing the penultimate measured time period to the product of the sync factor and the sum of the ultimate measured time period, the penultimate measured time period, and the antepenultimate measured time period.

If the shaft 14 includes an extra sync feature target wheel 20, as illustrated in FIGS. 2 and 3, the sync period is located when the penultimate measured time period is equal to or less than the product of the sync factor and the sum of the ultimate measured time period, the penultimate measured time period, and the antepenultimate measured time period as represented by step 36. Alternatively, if the shaft 14 includes a missing sync feature target wheel, as described above, the sync period is located when the penultimate measured time period is equal to or greater than the product of the sync factor and the sum of the ultimate measured time period, the penultimate measured time period, and the antepenultimate measured time period. In this manner, the method 30 locates the sync period and determines the sync position within a first revolution of the shaft 14.

Preferably, the sync factor is directly related to the ratio of the angle of the sync period and the angle of the periods surrounding the sync period. For example, in the seven feature target wheel 20 as illustrated in FIGS. 2 and 3, the sync factor is directly related to the ratio of the angle between the sixth timing feature and the seventh or sync feature and the angle between the fifth timing feature and the first timing feature. Optionally, a sync period signal is provided when the sync period is located.

After determining the sync position, a predetermined number of consecutive time periods generated in response to further or continued rotation of the shaft 14 are sequentially measured and stored, as represented by step 38, and the penultimate measured and stored time period is compared to a value calculated from the predetermined function, as represented by step 40. If the shaft 14 includes an extra sync feature target wheel 20, as illustrated in FIGS. 2 and 3, the sync period is verified when the penultimate measured time period is equal to or less than the product of the sync factor and the sum of the ultimate measured time period, the penultimate measured time period, and the antepenultimate measured time period as represented by step 40. Alternatively, if the shaft 14 includes a missing sync feature target wheel, as described above, the sync period is verified when the penultimate measured time period is equal to or greater than the product of the sync factor and the sum of the ultimate measured time period, the penultimate measured time period, and the antepenultimate measured time period. Optionally, step 38 can include counting a predetermined number of sync and timing features. In this manner, the method 30 verifies the location of the sync position within a second revolution of the shaft 14. Verifying the location of the sync position by performing the comparing step represented by step 40 only at or near the expected location of the sync period reduces the possibility of false sync period detections caused by large engine r.p.m. oscillations when starting the engine. Within the scope of the present invention, the method 30 can be modified to verify the location of the sync position during each successive revolution of the shaft 14.

In one embodiment of the method 30, after the sync position is determined, N consecutive time periods, wherein N is equal to the sum of the timing and sync features 24 and 26, generated in response to further or continued rotation of the shaft are sequentially measured and stored in the buffer. Next, the penultimate measured time period stored in the buffer is compared to a value calculated from the predetermined function. In this manner, the method 30 verifies the location of the sync position by performing the comparing step represented by step 40 only at the expected location of the sync period.

In another embodiment of the method 30, after the sync position is determined, N−1 consecutive time periods, wherein N is equal to the sum of the timing and sync features 24 and 26, generated in response to further or continued rotation of the shaft, are sequentially measured and stored in the buffer. The penultimate measured time period stored in the buffer is compared to a value calculated from the predetermined function. This comparison step is expected to be false because the penultimate measured time period is not the sync period but the time period before the sync period. Next, the N time period is measured and stored in the buffer. The penultimate measured time period stored in the buffer is compared to a new value calculated from the predetermined function. This comparison step is expected to be true because the penultimate measured time period is the sync period. Finally, the N+1 time period is measured and stored in the buffer. The penultimate measured time period stored in the buffer is compared to a new value calculated from the predetermined function. This comparison step is expected to be false because the penultimate measured time period is not the sync period but the time period after the sync period. In this manner, the method 30 verifies the location of the sync position by performing the comparing step represented by step 40 only when the expected sync period is stored in the rotating, three register buffer.

For example purposes, the method 30 is used to determine the sync position of the shaft 14, having the extra sync feature target wheel 20 as illustrated in FIG. 2, from the electrical signal 28 illustrated in FIG. 3. The method 30, illustrated in FIG. 4, begins when the engine shaft 14 starts to rotate during engine start-up. The method 30 measures the current time period between consecutive pulses of the electrical signal 28 with the sensor 16, as represented by step 32, stores the current measured time period in the rotating, three register buffer, as represented by step 34. Because the shaft 14 includes an extra sync feature target wheel 20, the method 30 determines if the penultimate measured time period is equal to or less than the product of the sync factor and the sum of the ultimate measured time period, the penultimate measure time period, and the antepenultimate measured time period, as represented by step 36. Steps 32, 34, and 36 repeat in a loop until the time period between the seventh pulse and the first pulse is measured and stored. As labeled in FIG. 3, when the time period between the seventh pulse and the first pulse is measured and stored, the ultimate measured time period ($t_u$) is the time period between the seventh pulse and the first pulse, the penultimate measured time period ($t_p$) is the time period between the sixth pulse and the seventh pulse, and antepenultimate measured time period ($t_a$) is the time period between the fifth pulse and the sixth pulse. The comparing step 36 will only be true (i.e. the penultimate measured time period ($t_p$) is equal to or less than the product of the sync factor and the sum of the ultimate measured time period ($t_u$), the penultimate measure time period ($t_p$), and the antepenultimate measured time period ($t_a$)) when the penultimate measured time period ($t_p$) is the time period between the sixth pulse and the seventh pulse. In this manner, the method 30 locates the sync period between the sixth pulse and the seventh pulse and determines the sync position of the shaft 14 within a first revolution of the shaft 14.

After the sync position is determined, the method 30 measures six consecutive time periods and stores each measure time period in the buffer, as represented by step 38. The time period between the sixth pulse and the seventh pulse is measured and stored in the buffer. The penultimate measured time period stored in the buffer (i.e. the time period between the fifth pulse and the sixth pulse) is compared to a value calculated from the predetermined function. This comparison step produces a false result. The time period between the seventh pulse and the first pulse is measured and stored in the buffer. The penultimate measured time period stored in the buffer (i.e. the time period between the sixth pulse and the seventh pulse) is compared to a value calculated from the predetermined function. This comparison step produces a true result, thus verifying the location of the sync period. The time period between the first pulse and the second pulse is measured and stored in the buffer. The penultimate measured time period stored in the buffer (i.e. the time period between the seventh pulse and the first pulse) is compared to a value calculated from the predetermined function. This comparison step produces a false result.

Figure 5:
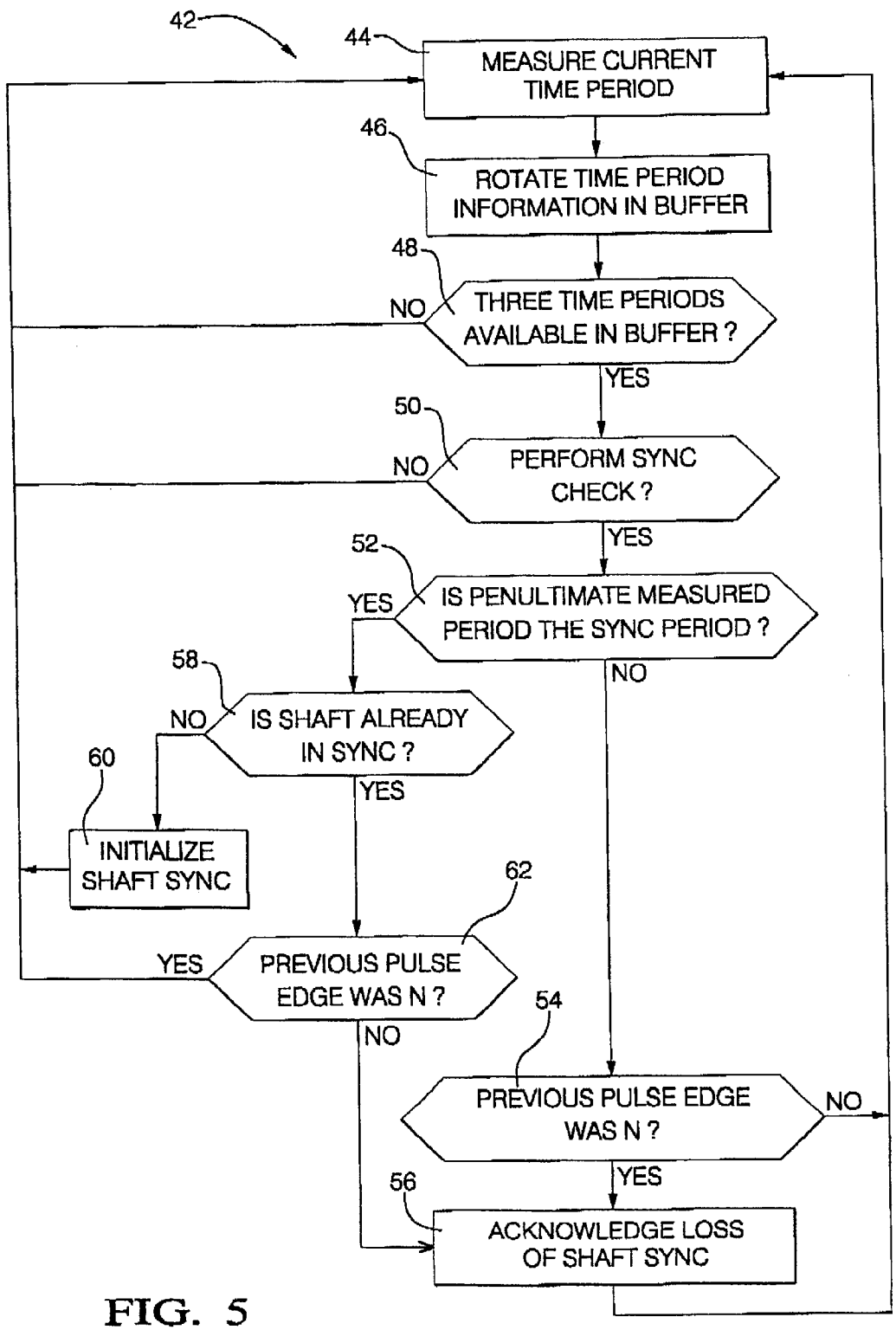
FIG. 5 is a flow chart for a preferred method for determining a position of an engine shaft in accordance with the present invention.

Referring now to FIG. 5, a flow chart illustrating a preferred method 42 for determining the sync position of the engine shaft 14 in accordance with the present invention is shown. As will be appreciated by one of ordinary skill in the art, although the flow chart illustrates sequential steps, the particular order of processing may be altered and still achieve the advantages of the present invention. As will also be recognized, the method illustrated may be performed in software in the controller 18, hardware in the system 12, or a combination of both as in a preferred embodiment of the present invention.

The method 42 includes measuring the current time period between consecutive timing and sync features 24 and 26 via the sensor 16 as the shaft 14 spins, as represented by step 44. The current measured time period is stored by rotating time period information in the first-in/first-out, three register buffer, as represented by step 46. More specifically, the measured time period stored in the third or last register is rotated out of the buffer, the measured time period stored in the second or middle register is rotated to the third register, the measured time period stored in the first register is rotated to the second register, and the current measured time period is stored in the first register. When the method 42 begins, the buffer is empty. Thus, the buffer is not initially filled until three time periods are measured and stored.

Next, the method 42 performs a query whether three measured time periods are stored in the buffer, as represented by step 48. As described above, three measured time periods are required to locate or verify the sync position. If three measured time periods are not stored in the buffer, then the method 42 returns to step 44 to fill the buffer. If three measured time periods are stored in the buffer, then the method 42 executes step 50.

Step 50 performs a query whether a sync check is necessary. When the method 42 begins, each timing and sync feature 24 and 26 is numbered with a zero. After the sync period is located, the each successive timing feature, beginning with the first timing feature, is consecutively numbered beginning with one. For example, in a seven feature system, after the sync period is located, the first timing feature is numbered with a one, the second timing feature is numbered with a two, the third timing feature is numbered with a three, the fourth timing feature is numbered with a four, the fifth timing feature is numbered with a five, and the sixth timing feature is numbered with a six and the sync or seventh feature is identified with a flag. In accordance with the logic of the method 42, a sync check is to be performed only when the sensor 16 detects a feature numbered with either zero, one, or six. In this manner, a sync check is to be performed during the initial rotation or first revolution of the shaft 14 for each measured time period until the sync position is located and a sync check is to be performed during further rotation or successive revolutions of the shaft 14 when the time period corresponding to the known or expected sync position is stored in either the first register, the second register, or the third register of the buffer. If a sync check is not necessary, then the method 42 returns to step 44. If a sync check is necessary, then the method 42 executes step 52.

Step 52 performs a query whether the penultimate measured time period (i.e. the measured time period stored in the second or middle register of the buffer) is the sync period. When the shaft includes an extra sync feature target wheel, the penultimate measured time period is calculated to be the sync period when the penultimate measured time period is equal to or less than the product of the sync factor and the sum of the three measured time periods stored in the buffer. When the shaft includes a missing sync feature target wheel, the penultimate measured time period is calculated to be the sync period when the penultimate measured time period is equal to or greater than the product of the sync factor and the sum of the three measured time periods stored in the buffer. If the penultimate measured time period is not the sync period, then the method 42 executes step 54. If the penultimate measured time period is the sync period, then the method 42 executes step 58.

Step 54 performs a query whether the previous pulse edge was N or, in other words, the Nth pulse edge, where N is the number of sync and timing features in the system. Once the sync period is located, a counter counts the falling edge of each pulse in a repetitive sequence from one to N. Thus, in a seven feature system, the seventh edge is associated with the sync feature 26. In this manner, step 54 determines whether the previous pulse edge was the sync edge to verify the result of step 52. More specifically, if the penultimate measured time period is not the sync period (result of step 52) but the previous pulse edge or, in other words, the pulse edge associated with the penultimate measured time period, is the sync or seventh edge, then the sync period has been missed and the method 42 executes step 56. If the penultimate measured time period is not the sync period (result of step 52) and the previous pulse edge is not the sync or seventh edge, then there is no indication that the sync period has been missed and the method 42 returns to step 44.

Step 56 verifies that the shaft sync has been lost. In other words, step 56 identifies that the method 42 has been unable to verify the expected location of the sync position determined during a previous revolution of the shaft 14. As a result, the method 42 returns to step 44 relocate the actual sync position.

Step 58 performs a query whether the shaft is already in sync. In other words, step 58 determines whether the sync position was known prior to the result of the previous step 52. In this manner, step 58 identifies whether the position of the sync period is (1) being located for the first time during a first revolution of the shaft 14, or (2) being verified during a successive revolution of the shaft 14. If the shaft is not already in sync, then the position of the sync period is being located for the first time during a first revolution of the shaft 14 and the method 42 executes step 60. If the shaft is already in sync, then the position of the sync period is being verified during a successive revolution of the shaft 14 and the method 42 executes step 62.

Step 60 initializes the shaft sync. Within the method 42, initialization information is used in regard to numbering the features (see step 50) and activation of the counter (see step 54 and 62) as described above.

Step 62 performs a query whether the previous pulse edge was N or, in other words, the Nth pulse edge, where N is the number of sync and timing features in the system. This query is similar to step 54. Once the sync period is located, a counter counts the falling edge of each pulse in a repetitive sequence from one to N. Thus, in a seven feature system, the seventh edge is associated with the sync feature 26. In this manner, step 62 determines whether the previous pulse edge was the sync edge to verify the result of step 52. More specifically, if the penultimate measured time period is the sync period (result of step 52) but the previous pulse edge or, in other words, the pulse edge associated with the penultimate measured time period, is not the sync or seventh edge, then a false sync period has been detected and the method 42 executes step 56. If the penultimate measured time period is the sync period (result of step 52) and the previous pulse edge is the sync or seventh edge, then sync period has been properly verified and the method 42 returns to step 44.

In summary, the present invention provides a method for determining and verifying a position of an engine shaft with improved accuracy.

What is claimed is:

1. A method for determining a sync position of a rotating shaft comprising:
   sequentially measuring consecutive time periods generated in response to rotation of the shaft; and
   comparing each measured time period to a value calculated from a predetermined function based on comparing a penultimate measured time period to a product of a sync factor and a sum of an ultimate measured time period, the penultimate measured time period, and an antepenultimate measured time period to determine a location of the sync position.

2. The method of claim 1 further comprising storing the measured time periods in a storage device.

3. The method of claim 2 wherein the storage device is a buffer for holding the ultimate measured time period, the penultimate measured time period, and the antepenultimate measured time period.

4. The method of claim 1 further comprising locating a sync period when a penultimate measured time period is equal to or less than a product of a sync factor and sum of an ultimate measured time period, the penultimate measured time period, and an antepenultimate measured time period.

5. The method of claim 1 further comprising locating a sync period when a penultimate measured time period is equal to or greater than a product of a sync factor and a sum of an ultimate measured time period, the penultimate measured time period, and an antepenultimate measured time period.

6. The method of claim 1 further comprising:

after determining the sync position, sequentially measuring a predetermined number of consecutive time periods generated in response to further rotation of the shaft.

7. The method of claim 6 further comprising comparing a penultimate measured time period to a value calculated from the predetermined function to verify the location of the sync position.

8. The method of claim 1 wherein the shaft includes a sync feature and a plurality of timing features and the time periods are measured between consecutive sync and timing features as the shaft rotates.

9. The method of claim 8 further comprising:

after determining the sync position, sequentially measuring N consecutive time periods generated in response to further rotation of the shaft, wherein N is equal to a sum of the sync and timing features.

10. The method of claim 9 further comprising comparing a penultimate measured time period to the value calculated from the predetermined function.

11. The method of claim 8 further comprising:

after determining the sync position, sequentially measuring N-1 consecutive time periods generated in response to further rotation of the shaft, wherein N is equal to a sum of the sync and timing features;

comparing an N-2 measured time period to the value calculated from the predetermined function;

measuring a N time period;

comparing an N-1 measured time period to the value calculated from the predetermined function;

measuring an N+1 time period; and comparing the N measured time period to the value calculated from the predetermined function.

12. A method for determining a sync position of a rotating shaft comprising:

sequentially measuring consecutive first, second, and third time periods generated in response to rotation of the shaft; and comparing the second measured time period to a product of a sync factor and a sum of the first, second and third measured time periods to determine the sync position.

13. The method of claim 12 further comprising storing the first, second, and third measured time periods in a storage device.

14. The method of claim 12 further comprising locating a sync period when the second measured time period is equal to or less than a product of a sync factor and the sum of the first, second, and third measured time periods.

15. The method of claim 12 further comprising locating a sync period when the second measured time period is equal to or greater than a product of a sync factor and the sum of the first, second, and third measured time periods.

16. The method of claim 12 wherein the shaft includes a sync feature and a plurality of timing features and the time periods are measured between consecutive sync and timing features as the shaft rotates.

* * * * *